Patented July 15, 1952

2,603,651

UNITED STATES PATENT OFFICE 2,603,651

PROCESS FOR PREPARING LYSINE

Roger Gaudry, Quebec, Quebec, Canada, assignor to Ayerst, McKenna & Harrison, Limited, Montreal, Quebec, Canada, a corporation of Canada No Drawing. Application December 4, 1947, Serial No. 789,771

5 Claims. (Cl. 260—465.4)

This invention relates to the synthesis of organic compounds, especially to the synthesis of amino acids and more particularly, the synthesis of dl-lysine.

Processes for the production of dl-lysine by prior syntheses involve the disadvantages of being difficultly producible on a commercial scale, involve complex reactions and result in poor yields. When produced by isolation from natural sources such as protein hydrolysates, the process of isolation is long and difficult and also results in very low yields.

The process of this invention results in the production of dl-lysine in a simple and easy manner and in much higher yields than heretofore accomplished since by my procedure all the reactions may be carried out in aqueous solution and intermediate compounds are readily purified by crystallization from water.

My invention also includes the production of new and useful compounds suitable for many uses and especially as intermediates for the production of amino acids other than dl-lysine.

One object of the present invention is the production of new and useful compounds.

Another object of the invention is the provision of an improved method for preparing certain amino acids.

A still further object of the invention is to provide an improved method for obtaining dl-lysine.

Other objects will become apparent to those skilled in the art from the disclosure appearing hereinbelow.

In accordance with the invention, the production of new compounds and dl-lysine is carried out by using deltahydroxy-valeraldehyde as the starting material. The preparation of this compound is taught in the art and can easily be prepared in good yield by reacting the commercially available dihydropyran with aqueous hydrochloric acid.

Reacting delta-hydroxy-valeraldehyde with gaseous HCN at room temperature yields the compound alpha, epsilon-dihydroxy-caproic nitrile which is easily isolated.

As an alternative procedure, when delta-hydroxy-valeraldehyde is reacted with an alkali metal acid sulfite such as sodium or potassium acid sulfite and followed by the addition of an alkali metal cyanide, preferably potassium cyanide, at room temperature and just enough water to dissolve the cyanide, the compound alpha, epsilon-dihydroxy-caproic nitrile is formed and in large part separates from the solution as a colorless oily liquid in an upper layer. Residual amounts of the nitrile may be extracted from the solution by means of ether. The reaction is illustrated in the following manner:

(1)
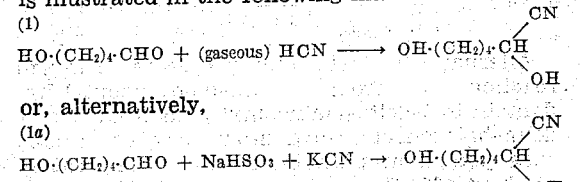

or, alternatively, (1a) $HO \cdot (CH_2)_4 \cdot CHO + NaHSO_3 + KCN \rightarrow OH \cdot (CH_2)_4 \cdot CH \langle _{OH}^{CN}$ When alpha, epsilon-dihydroxy-caproic nitrile is heated in water at a temperature of about 50° C. to about 60° C., preferably 50–55° C., with an excess of ammonium carbonate, the compound 5-delta-hydroxy-butyl-hydantoin is formed. The reaction is carried out for about one to two hours and finally the temperature is increased to the boiling point to remove the excess ammonium carbonate.

The hydantoin compound is obtained in the form of crystals. The reaction is illustrated as follows:

(2)
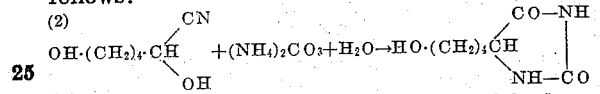

The compound 5-delta-hydroxy-butyl-hydantoin may now be halogenated to form 5-delta-halogeno-butyl-hydantoin by reacting the hydroxy compound with a halogenating agent such as an excess of 48% hydrobromic acid, thionyl chloride or bromide, phosphorous trichloride or phosphorous pentachloride or in fact any well-known halogenating agent. It is preferred, however, to select an agent which can easily be separated from the desired product on the completion of the reaction and for this reason, hydrobromic acid is the preferred agent. The reaction proceeds as shown:

(3)
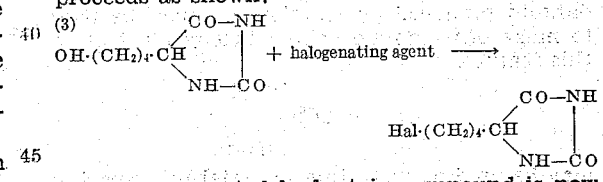

The halogenated hydantoin compound is now aminated to form 5-delta-aminobutyl-hydantoin by reacting it with an excess of concentrated ammonia in aqueous solution. This reaction goes easily at any desired temperature, which may vary over a wide range from about room temperature to about 100° C. Preferably, in order to avoid some hydrolysis, a temperature of about 50° to 60° C. is suggested.

The reaction is illustrated as follows:

(4) $Hal \cdot (CH_2)_4 \cdot CH \begin{array}{c} CO-NH \\ | \\ NH-CO \end{array} + NH_3 + H_2O \rightarrow H_2N \cdot (CH_2)_4 \cdot CH \begin{array}{c} CO-NH \\ | \\ NH-CO \end{array}$ Following the amination, the reaction mixture is now subjected to a hydrolysis operation, or alternatively, the amino-hydantoin compound may be isolated for the last step either as the free amine or in the form of the hydrochloride. The hydrolysis is carried out with an alkaline earth metal hydroxide such as barium or calcium hydroxide or in fact, any basic material which can be eventually separated easily from the desired compound. Preferably barium hydroxide is used since it can be easily removed on termination of the reaction by the addition of ammonium carbonate, in the form of a barium carbonate precipitate. The final hydrolysis reaction resulting in the formation of dl-lysine is illustrated as follows:

(5)
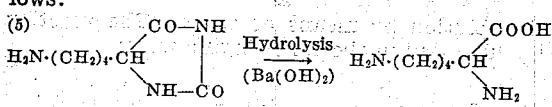

Alternatively, instead of proceeding through reaction (4) from 5-delta-halogenobutyl-hydantoin to 5-delta-aminobutyl-hydantoin, the 5-delta-halogenobutyl-hydantoin may be reacted with potassium phthalimide at a temperature of about 160° C. for about one to about one and a half hours to form 5-delta-phthalimido-butyl-hydantoin. This compound may be isolated and recrystallized from 30% aqueous alcohol. On acid hydrolysis preferably using dilute HCl, the phthalimido compound is converted to 5-delta-aminobutyl-hydantoin. These reactions are illustrated in the following steps:

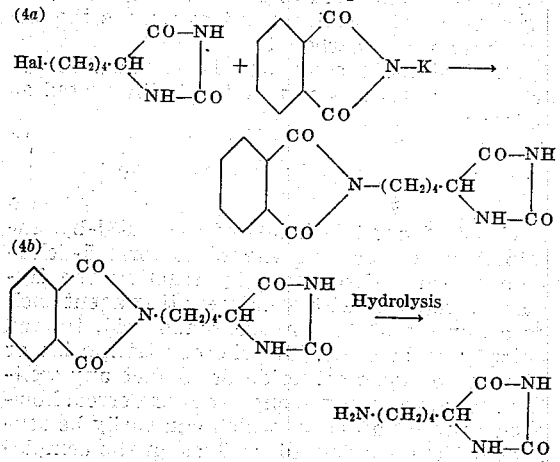

As noted above, the intermediate compounds may be used to prepare other useful compounds, as an example, 5-delta-hydroxy-butyl-hydantoin produced by reaction (2) may be used to make other amino acids. Briefly illustrating this feature,

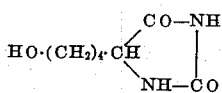

may be used as a starting material in preparing a new amino acid, alpha-amino-epsilon-hydroxy-caproic acid by either acid or alkaline hydrolysis. With acid hydrolysis, the hydantoin compounds is boiled under reflux in an excess of 60% sulfuric acid followed by the removal of the mineral acid with barium hydroxide. The amino acid may also be prepared by alkaline hydrolysis using an alkaline earth metal compound preferably barium hydroxide under reflux conditions, or better, under pressure, at 150–160° C., for a quarter to a half hour.

This new amino acid has been found to possess interesting physiological action and is useful either as the free base or as a salt of an inorganic or organic acid. It can be made into a large number of salts, for example, a hydrochloride, sulfate, oxalate, picrate, picrolonate, the copper salt, the mercury salt, etc.

The following examples illustrate the invention but it is to be understood that they are given merely for illustrative purposes and are not to be considered limitative of the invention. As will be apparent to those skilled in the art variations in conditions, in the quantities used and in the particular reactants employed will be obvious.

*5-delta-hydroxybutyl hydantoin*

Dihydropyran (100 g., 1.19 mole) was hydrolyzed into delta-hydroxy-valeraldehyde with 0.02 N hydrochloric acid. After carefully neutralizing the solution with sodium hydroxide, dry sodium acid sulfite (125 g., 1.20 mole) was added with good mechanical stirring to the aqueous solution of the aldehyde kept at room temperature by dipping the flask into a bath of cold running water. When all the sodium bisulfite had dissolved, a solution of potassium cyanide (78 g., 1.2 mole) in water (100 ml.) was slowly added and stirring was continued at room temperature for two hours. The mixture was poured into a separatory funnel, the upper layer was separated and the aqueous layer was extracted four times with large volumes (4x250 ml.) of ether. The ether was evaporated on the water-bath, and the residue was added to the main portion from the upper layer. This liquid, which is nearly pure, colorless alpha-epsilon-dihydroxycaproic nitrile, was added to a solution of ammonium carbonate (230 g., 2.4 moles) in water (400 ml.) and the mixture was stirred for one hour while being kept at 50–55° C. in a water bath. The temperature of the bath was then raised slowly to boiling, a little Norit added, the solution was filtered into a large evaporating dish and evaporated to dryness on a water-bath. The residue was recrystallized from water; melting point: 152 to 155° C. Calc. for $C_7H_{12}O_3N_2$: N, 16.27%. Found (Kjeldahl): N, 16.17%.

*dl-Alpha-amino-epsilon-hydroxycaproic acid*

5-delta-hydroxybutylhydantoin (51.6 g., 0.30 mole), barium hydroxide (151.5 g. of the octahydrate, 0.48 mole) and boiling water (750 ml.) were mixed together and the solution was heated in an autoclave at 160° C. for half an hour. The solution was cooled, filtered from the barium carbonate, treated with powdered ammonium carbonate (30 g.), again filtered from the barium carbonate, and evaporated to dryness under reduced pressure. The residue was slurried with methanol and suction filtered to give pure dl-alpha-amino-epsilon-hydroxycaproic acid. It is readily recrystallized from water. The melting point varies between 245–248° C. and 260–262° C. with evolution of gas, according to the rate of heating. Calc. for $C_6H_{13}O_3N$: N, 9.52%. Found (Kjeldahl): N, 9.45%. The picrate melts at 127–130° C. Calculated for $C_{12}H_{16}O_{10}N_5$: N, 14.89%. Found: N, 14.56%.

*5-delta-bromobutylhydantoin*

5-delta-hydroxybutylhydantoin (34.4 g., 0.2 mole) was treated with 48% hydrobromic acid (400 ml.), and the solution was kept at 90° C. for two hours, in a water-bath. It was then evaporated to dryness in vacuo, the residue was dissolved in boiling water (300 ml.), boiled under reflux for five minutes with a little Norit, filtered, and allowed to cool. The precipitate was filtered and the solution was evaporated to dryness in vacuo.

The residue was again treated with 48% hydrobromic acid (100 ml.) for two hours at 90° C., the acid was evaporated in vacuo, and the residue decolorized with Norit and crystallized from hot water (30 ml.). After two crystallizations, the melting point was 129–131° C. Calculated for $C_7H_{11}O_2N_2Br$: N, 11.97%. Found (Kjeldahl): N, 11.91%.

5-delta-chlorobutylhydantoin 5-delta-hydroxybutylhydantoin (17.2 g., 0.1 mole) and thionyl chloride (7.6 g., 0.1 mole) was rapidly mixed in a beaker with a glass rod, and allowed to stand for one hour at room temperature, under a hood. The mixture was then dissolved in hot water (100 ml.) and cooled. The precipitate was filtered and recrystallized from a little hot water. Melting point: 126–128° C. Calculated for $C_7H_{11}O_2N_2Cl$: N, 14.70%. Found (Kjeldahl): N, 14.66%.

5-delta-phthalimidobutylhydantoin 5-delta-bromobutylhydantoin (23.5 g., 0.1 mole) and potassium phthalimide (18.5 g., 0.1 mole) were intimately mixed in a mortar, the mixture was transferred to a conical flask and heated at 150° C. for one and a half hour in an oil bath. After cooling, the mass was washed in a mortar by decantation with three portions of water (100 ml.) and recrystallized from a mixture of water (225 ml.) and alcohol (150 ml.). A high yield may be obtained by working up the mother liquor. After three crystallizations, the melting point was 212–215° C., with sintering at about 170° C. Calculated for $C_{15}H_{15}O_4N_3$: N, 13.95%. Found (Kjeldahl): N, 13.93%.

5-delta-aminobutylhydantoin 5-delta-bromobutylhydantoin (7.83 g., 1/30 mole) and concentrated ammonia (160 ml.) were placed in a 200 ml. pressure bottle, and the solution was heated at 60° C. for four days. The solution was evaporated to dryness in vacuo. The residue was dissolved in water (100 ml.), the solution was boiled for a few minutes with freshly precipitated silver oxide (4 g.), filtered, acidified with a slight excess of hydrochloric acid, and evaporated to dryness in vacuo. 5-delta-aminobutylhydantoin hydrochloride slowly solidified on standing. It is very soluble in water and alcohol, and precipitates as an oil by adding ether to the alcoholic solution. It was not obtained in a pure state, but only as pale brownish powder which melted at 163–170° C. Calculated for $C_7H_{14}O_2N_3Cl$: N, 20.24%. Found (Kjeldahl): N, 19.25%. The picrate was obtained by treating the aqueous solution of the hydrochloride with one equivalent of picric acid and was recrystallized from very little water. Melting point, 180–183° C. It analyses for the monohydrate. Calculated for $C_{13}H_{16}O_9N_6H_2O$: N, 20.09%. Found: N, 20.01%.

dl-Lysine 5-delta-bromobutylhydantoin (23.5 g., 0.1 mole) was aminated in presence of a large excess of concentrated ammonia (500 ml.) by heating for four days at 60° C. in pressure bottles. The solution was evaporated to dryness under reduced pressure. The residue was dissolved in a solution of barium hydroxide (78 g., 0.25 mole of the octahydrate) in hot water (500 ml.), and heated in an autoclave at 160° C. for one half hour. After cooling, the mixture was filtered, and the solution treated with an excess of ammonium carbonate (30 g.), filtered again from the barium carbonate, and evaporated to dryness in vacuo. The residue was acidified with an excess of dilute hydrochloric acid and evaporated to dryness. The mixture of crude lysine dihydrochloride and ammonium bromide was dissolved in a solution of picric acid (23 g.) in boiling water (1200 ml.). The solution was allowed to cool, and placed in the ice-box for 48 hours. Lysine dipicrate crystallized out. A sample, which was recrystallized from a little hot water, melted at 188° C., undepressed when mixed with an authentic sample. Pure dl-lysine dihydrochloride was readily obtained from the dipicrate, by treating the dipicrate with an excess of aqueous hydrochloric acid, filtering and extracting the last traces of picric acid with ether, decolorizing with Norit and evaporating to dryness in vacuo. The product obtained was the dihydrate which melted at 186–189° C. after grinding with alcohol. Calc. for $C_6H_{16}O_2N_2Cl_2 \cdot 2H_2O$: N, 10.98%. Found (Kjeldahl): N, 10.91%.

The free base, i. e., dl-lysine may be obtained by treating the dihydrochloride with the calculated amount of silver oxide, as known to the art. As is also known to the art, the monohydrochloride of dl-lysine may also be obtained from the dihydrochloride.

I claim:
1. The new compound alpha-epsilon-dihydroxy-caproic nitrile.
2. The process of preparing alpha, epsilon-dihydroxy-caproic nitrile comprising reacting delta-hydroxy-valeraldehyde with an alkali metal acid sulfite and an alkali metal cyanide in aqueous solution, said reaction being carried out at room temperature, and then separating the oily liquid product from the reaction mixture as the desired alpha, epsilon-dihydroxy-caproic nitrile.
3. The process of preparing alpha, epsilon-dihydroxy-caproic nitrile comprising adding an alkali metal acid sulfite to delta-hydroxyvaleraldehyde, adding to said mixture an aqueous solution of alkali metal cyanide and reacting the mixture at room temperature until an oily layer separates from the aqueous reaction mixture, and then isolating said oily reaction product as the desired alpha, epsilon-dihydroxy-caproic nitrile.
4. The process comprising, reacting the compound alpha, epsilon-dihydroxy-caproic nitrile by commingling said compound with ammonium carbonate in aqueous solution, separating out a hydantoin reaction product, reacting the latter with a halogenating agent to form a halogenated-alkyl hydantoin, treating the latter with an alkali metal phthalimide at elevated temperatures, isolating the 5-delta-phthalimido-butyl hydantoin formed, hydrolyzing the phthalimido reaction product to form 5-delta-aminobutyl-hydantoin and finally further hydrolyzing the last-named compound to form dl-lysine.
5. The process of claim 4; wherein the dihydroxy caproic nitrile reactant is formed by reacting delta-hydroxy-valeraldehyde with an alkali metal acid sulfite and an alkali metal cyanide in aqueous solution at room temperature.

ROGER GAUDRY.

REFERENCES CITED

The following references are of record in the file of this patent:

Livak et al., Jr. Am. Chem. Soc., vol. 67, December 1945, pp. 2219–2220.